United States Patent [19]

Hagio et al.

[11] Patent Number: 4,524,104
[45] Date of Patent: Jun. 18, 1985

[54] ADHESIVE COMPOSITION AND LAMINATES THEREFROM

[75] Inventors: Shigeru Hagio, Mukou; Youji Kawachi, Oumihachiman, both of Japan

[73] Assignee: Sanyo Chemical Industries, Ltd., Kyoto, Japan

[21] Appl. No.: 401,816

[22] Filed: Jul. 26, 1982

[30] Foreign Application Priority Data

Aug. 25, 1981 [JP] Japan .................................. 56-133590

[51] Int. Cl.$^3$ ...................... B32B 27/06; B32B 27/08; B32B 27/10; C09J 3/26
[52] U.S. Cl. .................................. 428/341; 156/230; 427/207.1; 427/208.4; 427/374.2; 427/385.5; 427/388.1; 427/389.9; 427/391; 428/342; 428/343; 428/344; 428/349; 428/355; 428/425.1; 428/461; 428/537.5; 428/913; 525/123; 525/124; 525/455
[58] Field of Search ...................... 525/123, 455, 124; 528/75; 428/355, 346, 347, 349, 913, 342, 341, 343, 344, 425.1, 461, 537.5; 156/230; 427/207.1, 208.4, 385.5, 388.1, 389.9, 391

[56] References Cited

U.S. PATENT DOCUMENTS 4,145,514 3/1979 De Vry et al. ...................... 528/75
4,214,061 7/1980 Lee ...................................... 525/455

FOREIGN PATENT DOCUMENTS 37503 11/1971 Japan .................................. 525/123

OTHER PUBLICATIONS

Hashimoto et al., translation of Japan Patent Publication No. 37,503, Nov. 1971, 11 pp.
Z. Wicks, Jr., "Blocked Isocyanates", Progress in Organic Coatings, 3 (1975) pp. 73–99.

Primary Examiner—Thomas J. Herbert
Attorney, Agent, or Firm—Oblon, Fisher, Spivak, McClelland & Maier

[57] ABSTRACT

An adhesive composition comprises (A) an acrylic copolymer having NCO-reactive groups, (B) a blocked polyisocyanate and (C) a cycloamidine or acid addition salt thereof, as catalyst. The composition can be applied by hot-melt coating. Cured products from the composition are useful as pressure-sensitive adhesives.

27 Claims, No Drawings

ADHESIVE COMPOSITION AND LAMINATES THEREFROM

BACKGROUND OF THE INVENTION

1. Field of the Invention

This invention relates to an adhesive compositon. More particularly, it relates to an adhesive composition useful for pressure-sensitive adhesives and laminates therefrom.

2. Description of the Prior Art

Pressure-sensitive adhesives made from acrylic copolymers having NCO-reactive groups and blocked isocyanates as crosslinker are disclosed in Japan Patent Lay Open No. 2742/1976. The adhesives contain the blocked isocyanates in such amounts to provide equivalent ratio of blocked NCO groups to NCO-reactive groups of the copolymers within 0.5–10 particularly 3–7. Such adhesives have drawbacks that tackiness is influenced by processing conditions (temperature and time) and is considerably reduced at higher temperature or longer time, and that applied products such as pressure-sensitive tapes, and labels are likely to change in quality during storage over long period of time.

SUMMARY OF THE INVENTION

Accordingly, it is an object of the present invention to provide an adhesive composition which can form products having excellent tackiness regardless of processing conditions.

It is another object of this invention to provide a pressure-sensitive materials having improved storage stability.

Briefly these and other objects of the invention as hereinafter will become more readily apparent have been attained broadly by providing a composition, which comprises (A) at least one acrylic copolymer having NCO-reactive groups, (B) at least one blocked polyisocyanate, and (C) catalyst comprising at least one cycloamidine compound selected from the group consisting of cycloamidine and salt thereof, wherein equivalent ratio of blocked NCO group of (B) to NCO-reactive group of (A) is 0.01–0.4:1.

DETAILED DESCRIPTION OF THE PREFERRED EMBODIMENTS

Cycloamidines suitable for use in this invention have the general formula (1):

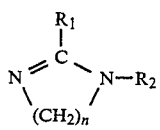

wherein $R_1$ is H or an alkyl group having 1–8 carbon atoms, $R_2$ is an alkyl group having 1–8 carbon atoms, or $R_1$ and $R_2$ may be joined to form a ring having 2–11 methylene groups, n is an integer of 2–6, and each of the methylene groups may carry a lower alkyl substituent.

Suitable cycloamidines include diaza-bicyclo-alkenes having the general formula (2):

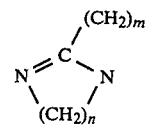

wherein m is an integer of 2–11, n is an interger of 2–6, and each of the methylene groups may carry lower alkyl substituent.

The cycloamidines and salts thereof usable in this invention include, for example, those described in Japan Patent Publication No. 37503/1971.

Suitable examples of the cycloamidines are:
1-Methyl imidazoline
1,2-Dimethyl imidazoline
1-Methyl-2-ethyl imidazoline
1-Methyl-2-octyl imidazoline
1,2-Diethyl imidazoline
1-Methyl-1,4,5,6-tetrahydropyrimidine
1,2-Dimethyl-1,4,5,6-tetrahydropyrimidine
1-Methyl-2-ethyl-1,4,5,6-tetrahydropyrimidine
1,2-Diethyl-1,4,5,6-tetrahydropyrimidine
1-Methyl-2-propyl-1,4,5,6-tetrahydropyrimidine
1-Methyl-2-butyl-1,4,5,6-tetrahydropyrimidine
1-Methyl-2-octyl-1,4,5,6-tetrahydropyrimidine
1-Ethyl-2-octyl-1,4,5,6-tetrahydropyrimidine
1,2,4-Trimethyl-1,4,5,6-tetrahydropyrimidine
1,2,5-Trimethyl-1,4,5,6-tetrahydropyrimidine
1,2,6-Trimethyl-1,4,5,6-tetrahydropyrimidine
1,5-Diaza-bicyclo(4,2,0)octene-5
1,8-Diaza-bicyclo(7,2,0)undecene-8
1,4-Diaza-bicyclo(3,3,0)octene-4
3-Methyl-1,4-diaza-bicyclo(3,3,0)octene-4
3,6,7,7-Tetramethyl-1,4-diaza-bicyclo(3,3,0)octene-4
7,8,8-Trimethyl-1,5-diaza-bicyclo(4,3,0)nonene-5
1,8-Diaza-bicyclo(7,3,0)tridecene-8
1,7-Diaza-bicyclo(4,3,0)nonene-6
1,5-Diaza-bicyclo(4,4,0)decene-5
1,5-Diaza-bicyclo(4,3,0)nonene-5
1,8-Diaza-bicyclo(7,4,0)tridecene-8
1,8-Diaza-bicyclo(7,3,0)dodecene-8
1,8-Diaza-bicyclo(5,3,0)decene-7
9-Methyl-1,8-diaza-bicyclo(5,3,0)decene-7
9-Methyl-1,8-diaza-bicyclo(5,4,0)undecene-7
1,8-Diaza-bicyclo(5,4,0)undecene-7
1,6-Diaza-bicyclo(5,5,0)dodecene-6
1,7-Diaza-bicyclo(6,5,0)tridecene-7
1,8-Diaza-bicyclo(7,5,0)tetradecene-8
1,10-Diaza-bicyclo(7,3,0)dodecene-9
1,10-Diaza-bicyclo(7,4,0)tridecene-9
1,14-Diaza-bicyclo(11,3,0)hexadecene-13
1,14-Diaza-bicyclo(11,4,0)heptadecene-13

Among the cycloamidines, preferred are the diazabicyclo-alkenes having the general formula (2), particularly those where n is 3–5 and m is 2 or 3. Most preferred is 1,8-diaza-bicyclo(5,4,0)undecene-7 (hereinafter referred to as DBU).

Acid addition salts of the cycloamidines are also useful in the present invention. The term "acid addition salts" is intended to include the salts formed with acids as well as the salts formed with other proton-donating compounds. Acids or other proton-donating compounds include, for example, phenols and carboxylic acids. Suitable examples of phenols are monohydric phenols such as phenol, cresols, xylenols, naphthols, trimethyl phenols, tetramethyl phenols, pentamethyl phenols, ethyl phenols, n- and iso-propyl phenols, n- and iso-butyl phenols, cyclohexyl phenols, n- and iso-pentyl phenols, isooctyl phenols, iso-nonyl phenols, iso-dodecyl phenols, thymol, carvacrol, di-alkyl phenols having 2-24 carbon atoms in the alkyl goups, and other di- or poly-alkyl phenols, alkoxy-substituted phenols (such as guaiacol, and eugenol), and the like; dihydric phenols such as catechol, resorcin, hydroquinone, and the like; and polyhydric phenols such as pyrogallol, phloroglucin and the like. Suitable carboxylic acids include, for example, straight-chain or branched fatty acids such as formic, acetic, propionic, butyric, valeric, caproic, enanthic, caprylic, pelargonic, capric, undecylic, lauric, tridecylic, myristic, pentadecylic, palmitic, heptadecylic, stearic, and 2-ethyl hexanoic acids; unsaturated fatty acids such as acrylic, crotonic, isocrotonic, undecylenic, oleic, elaidic, cetoleic, erucic, brassidic, sorbic, linoleic, linolenic, arachidonic, propiolic, and stearolic acids; hydroxycarboxylic acids such as lactic glycolic, tartaric, ricinoleic, and hydroxy-stearic acids; di- or poly-carboxylic acids such as oxalic, malonic, succinic, fumaric, and adipic acids; aromatic carboxylic acids such as benzoic, and salicylic acids, and the like. Other examples of the acids or other proton-donating compounds include enols such as barbituric acid and uric acid; sulfonic acids; sulfinic acids; sulfonamides; and inorganic acids such as carbonic acid, phosphoric acid, hydrochloric acid, sulfuric acid, and the like. Among these, preferred are phenols (particularly phenol) and carboxylic acids (particularly formic acid and 2-ethyl hexanoic acid).

These cycloamidine compounds (cycloamidines and salts thereof) are catalysts for deblocking (dissociation) of blocked-NCO groups as well as reaction of free (reproduced) NCO-groups with NCO-reactive groups.

Catalyst (C) comprising at least one cycloamidine compound, may include optionally one or more other catalysts for deblocking and/or reaction of NCO-groups, comonly used in the art. Exemplary of such catalysts are those described in "Progress in Organic Coatings", 3 (1975) 79, including tertiary amines, tin compounds and the other metal compounds.

Acrylic copolymers (A) having NCO-reactive groups suitable for use in the composition of this invention are copolymers of at least one ethylenically unsaturated monomer (a) having at least one NCO-reactive group and at least one ethylenically unsaturated monomer (b) having no NCO-reactive group comprising an ester of (meth)acrylic acid with an alcohol having 1-14 carbon atoms.

[The term "(meth)acrylic acid" means acrylic acid and/or methacrylic acid. Similar notations are used hereinafter.]

Suitable NCO-reactive groups are groups containing active hydrogen atoms, according to Zerewitinoff test. Illustrative of some of the active hydrogen atom-containing groups are —COOH, —OH, —NH$_2$, =NH, —CONH$_2$ and —SH.

Suitable examples of monomers (a) include carboxyl group-containing monomers: monoethylenically unsaturated mono- or poly-carboxylic acids such as (meth)acrylic acid, crotonic acid, maleic acid, fumaric acid, and itaconic acid; hydroxyl group-containing monomers: monoethylenically unsaturated alcohols such as (meth) allyl alcohol, monoethylenically unsaturated ethers or esters of polyols (such as alkylene glycols, glycerol, polyoxyalkylene polyols) such as hydroxyethyl (meth)acrylate, hydroxypropyl (meth)acrylate, di- or triethylene glycol (meth)acrylate, and poly (oxyethyleneoxypropylene)glycol mono (meth)allyl ether, hydroxyalkyl-substituted (meth)acrylamides such as N-methylol (meth)acrylamide, N-hydroxyethyl (meth)acrylamide, and N,N-dihydroxyethyl (meth)acrylamide; amide group-containing monomers such as (meth)acrylamide; amino group-containing monomers such as t-butylaminoethyl (meth)acrylate; and mercapto group-containing monomers such as vinyl 2-ethylmercaptethyl ether. Among these, preferred are carboxyl group-containing monomers [particularly (meth)acrylic acid], hydroxyl group-containing monomers [particularly hydroxyethyl (meth)acrylate] and amide group-containing monomer (particularly acrylamide).

Suitable examples of esters of (meth)acrylic acid with an alcohol having 1-14 carbon atoms include (meth)acrylates of aliphatic, straight-chain or branched, natural or synthetic alcohols such as methyl, ethyl, n- and i-propyl, n-, i- and t-butyl, pentyl, octyl, 2- ethylhexyl, decyl, lauryl, tridecyl and myristyl (meth)acrylates, (meth)acrylates of oxo-alcohols(C 4-8) and (meth)acrylates of Zigler alcohols (C 4 -8); (meth)acrylates of cycloaliphatic alcohols such as cyclohexyl (meth)acrylate; and (meth)acrylates of aromatic alcohols such as benzyl (meth)acrylate. Two or more of these monomers may be used. Among these, preferred are (meth)acrylates of aliphatic alcohols having 2-10 carbon atoms. Most preferred are alkyl (C 4) acrylates and alkyl (C 8) acrylates, and mixtures of these.

In addition to these esters of (meth)acrylic acid with an alcohol having 1-14 carbon atoms, other ethylenically unsaturated monomers having no NCO-reactive group may be used for porducing the acrylic copolymer (A) in this invention. Suitable examples of such monomers are: vinyl and (meth)allyl esters of carboxylic acid having 2-8 carbon atoms such as vinyl acetate, vinyl propionate, vinyl butyrate, vinyl trialkylacetate [vinyl esters of Versatics (produced by Shell Chemicals), such as vinyl pivalate], (meth)allyl acetate, and the like; vinyl and (meth)allyl ethers of alkyl groups having 1-8 carbon atoms, such as vinyl methyl ether, vinyl ethyl ether, vinyl propyl ether, vinyl isobutyl ether, (meth)allyl methyl ether, and the like; (meth) acrylates of alkoxyalkyl, alkylthioalkyl and cyano alkyl radicals having 2-12 carbon atoms, and alkyl radicals having 15-18 carbon atoms, such as octadecyl, methoxyethyl, butoxyethyl, hexylthioethyl, β-cyanoethyl, cyanooctyl (meth)acrylates, and the like; vinyl aromatic hydrocarbon monomers, such as styrene, α-methyl styrene, vinyl toluene, and the like; vinyl nitriles, such as (meth)acrylonitrile; halogen-containing monomers, such as vinyl cholride, vinyl bromide, vinylidene chloride, chlorostyrene, and the like; monoolefins containing 2-14 carbon atoms, such as ethylene, propylene, isobutylene, 1-butene, 1-pentene, 1-hexene, 1-dodecene and the like; dienes containing 4-10 carbon atoms such as butadiene, isoprene, 2-isopropyl-1,3-butadiene and the like; heterocyclic vinyl monomers such as N-vinyl pyrrolidone, vinylpyridines, and the like; and epoxy-containing monomers such as glycidyl (meth)acrylate, and the like. Two or more of these comonomers may be used. Among these comonomers, preferred are vinyl esters particularly vinyl acetate and vinyl propionate.

Illustrative examples of useful polymeric backbones in the acrylic copolymers include poly (acrylic acid/butyl acrylate), poly (acrylic acid/butyl acrylate/vinyl acetate), poly (hydroxyethyl acrylate/butyl acrylate), poly (hydroxyethylacrylate/butyl acrylate/ethyl acrylate), poly (hydroxyethyl acrylate/butyl acrylate/a- cryronitrile), poly (hydroxyethyl acrylate/2-ethylhexylacrylate/vinyl acetate), poly (acrylic acid/butyl acrylate/2-ethylhexylacrylate), poly (hydroxyethyl acrylate/butyl acrylate/2-ethylhexyl acrylate), and poly (acrylamide/2-ethylhexyl acrylate/butyl acrylate).

The proportion of monomers (a) and (b) in the acrylic copolymer used in the present invention is not particularly critical, but the weight ratio of (a):(b) is usually 0.5:99.5–10:90, preferably 1:99–6:94. When the proportion of (a) is less than 0.5% by weight, pressure-sensitive adhesives show cohesive failure because of their insufficient crosslinking. Using (a) in an amount larger than 10% by weight causes tack reduction.

Amount of the esters of (meth)acrylic acid with alcohols having 1–14 carbon atoms is usually at least 20%, preferably at least 50%, more preferably at least 70% based on the weight of the monomers (b) having no NCO-reactive group. Use of lower amount of the (meth) acrylate than 20% results in poor tackiness.

Acrylic copolymers of monomers (a) and (b) can be produced by any polymerization methods known to the art, including bulk, solution, emulsion and suspension polymerization methods. Bulk polymerization is most preferred because it is unnecessary to distill off solvent. Other polymerization techniques (such as solution polymerization and emulsion polymerization) may be conducted, followed by isolating the copolymers (for example, by reprecipitationintobad solvent, by distilling off solvent,by salting-out by filtration, and the like). In carrying out polymerization, free radical initiator is usually used as polymerization catalyst. Suitable free radical initiators include oil-soluble initiators, for example, peroxides such as benzoyl peroxide, lauroyl peroxide, and the like; azo compounds such as azobisisobutyronitrile, azobisdimethylvaleronitrile, azobiscyanovaleric acid, and the like; and water-soluble initiators, for example, persulfates such as sodium persulfate, ammonium persulfate and the like; hydrogen peroxide; redox catalysts: combinations of oxidizing agents and reducing agents, such as combination of hydrogen peroxide and ferric chloride, and the like. The amount of the polymerization initiator is usually 0.01–5% based on the weight of the total monomers. Polymerization temperature, which is to be selected according to decomposition temperature of the initiator, is usually 0°–200° C. Polymerization time is usually 1–24 hours. If necessary, any chain transfer agent known to the art may be used to regulate polymerization degree (melt-viscosity) of the resulting copolymers. Suitable examples of such agents are mercaptans such as dodecyl mercaptan, n-butylmercaptan; and halogenated hydrocarbon such as carbon tetrachloride, and the like.

Acrylic copolymers (A) may be produced by polymerizing, in stead of at least a part of the monomer (a) or (b), precursor thereof and then modifying the precursor monomer units in the polymer into units of the monomer (a) or (b). For example, polymers or copolymers of hydrolyzable group-containing monomer [ester-containing monomers such as alkyl (meth)acrylates and vinyl acetate, acid anhydride-containing monomers such as maleic anhydride, and nitrile-containing monomers such as (meth)acrylonitrile] may be partially hydrolyzed to obtain acrylic copolymer (A) having carboxyl groups or hydroxyl groups.

Molecular weight (weight average molecular weight) of acrylic copolymer (A) may range usually about 5,000–about 1,000,000 preferably about 50,000–about 500,000. Melt-viscosity of the copolymer is usually about 1,000–about 500,000 preferably about 5,000–about 200,000 cps. at 100°–200° C. Use of acrylic copolymers having monocular weight lower than 5,000 results in reduction of tack and poor static shear performance, and those having molecular weight higher than 1,000,000 is dificult to apply by hot-melt coating.

Blocked polyisocyanates are reaction products of organic polyisocyanates with blocking agents, and any blocked polyisocyanate known to the art may be used in the present invention.

As blocking agents, there may be used those described in "Progress in Organic Coatings", 3 (1975) 73-99. Suitable examples of blocking agent include phenols such as phenol, cresols, xylenols, trimethyl phenols, ethyl phenols, propyl phenols, chlorophenols, nitro phenols, thymols, carbacrols, mono-, di- and tri-α-phenyl ethyl phenols, and tertiary butyl phenols; C- H- acid compounds (compounds having activated methylene groups: β-dicarbonyl compounds), for example, aceto-acetic esters such as aceto-acetic acid alkyl ester with a C1–C4 alkyl radical (such as aceto-acetic acid ethyl ester), malonic acid esters such as malonic acid dialkyl esters with C1–C4 alkyl groups (such as diethyl malonate, ethyl n-butyl malonate) and ethyl benzyl malonate, malononitrile, acetyl acetone, acetonyl acetone, benzimidazole, and 1-phenyl-3-methyl-5-pyrazolon; lactams such as ε-caprolactam, δ-valerolactam, γ-butyrolactam and β-propiolactam; oximes (ketoximes and aldoximes) such as acetone oxime, methyl ethyl ketone oxime, cyclohexanone oxime, maldoxime, acetaldoxime, acetophenone oxime, benzophenone oxime and diethyl glyoxime; bisulfites such as sodium bisulfite; tertiary alcohols such as tertiary butyl alcohol, tertiary amyl alcohol, dimethyl ethynyl carbinol, dimethyl phenyl carbinol, methyl diphenyl carbinol, triphenyl carbinol, 1-nitro tertiary butyl carbinol, 1-chloro tertiary butyl carbinol, and triphenyl silinol; secondary aromatic amines which contain only one group having a hydrogen reactive with an isocyanate group, such as the diaryl compounds which are preferred, including diphenyl amine, o-ditolyl amine, m-ditolyl amine, p-ditoly amine, N-phenyl toluidine, N-phenyl xylidine, phenyl α-naphthyl amine, phenyl β-naphthyl amine, carbazole, and the nuclear substituted aromatic compounds such as 2,2'-dinitro diphenyl amine and 2,2'-dichloro diphenyl amine; mercaptans such as 2-mercaptobenzothiazole, 2-mercapto thiazoline, dodecyl mercaptan, ethyl 2-mercapto thiazole, dimethyl 2-mercapto thiazole, β-naphthyl mercaptan, α-naphthyl mercaptan, phenyl 2-mercapto thiazole, 2-mercapto 5-chloro-benzothiazole, methyl mercaptan, ethyl mercaptan, propyl mercaptan, butyl mercaptan, phenyl mercaptan, tolyl mercaptan, ethyl phenyl mercaptan, and ethynyl dimethyl thiocarbinol; imides such as carbimide, succinimide, phthalimide, naphthalimide, and glutarimide; and the like.

Among these, preferred are phenols (especially phenol ahd cresols), and oximes (particularly acetoxime, methyl ethyl ketone oxime, and cyclohexanone oxime).

Any organic polyisocyanate may be used in forming blocked polyisocyanates. Representative examples are aromatic polyisocyanates such as tolylene diisocyanates (TDI), diphenyl methane diisocyanates (MDI), polyphenylmethane polyisocyanates, naphtylene diisocyanates, phenylene diisocyanates, xylylene diisocyanates, tolidine diisocyanates, diphenyl diisocyanates, diphenyl ether diisocyanates, anisidine diisocyanate, chlorodiphenylene diisocyanates and the like; aliphatic polyisocyanates, such as ethylene, trimethylene, tetramethylene, pentamethylene and hexamethylene diisocyanates (HDI), and the like; cycloaliphatic polyisocyanates, such as cyclohexylene diisocyanates, dicyclohexyl methane diisocyanate ($H_{12}MDI$), isophorone diisocyanate (IPDI), and the like; modified polyisocyanates (containing carbodiimide, uretdione, urethaneimine, isocyanurate, urea and biuret groups) derived from the above polyisocyanates, such as carboimide-modified MDI, water-modified HDI, trimer of IPDI and the like; two or more of these polyisocyanates; and NCO-terminated compounds (prepolymers) obtained by reacting excess of these polyisocyanates with active hydrogen atom-containing compounds, for example, low molecular weight polyols such as ethylene glycol, propylene glycol, butane diols, hexane diols, glycerin, trimethylol propane, hexane triols, sorbitol, castor oil, triethanol amine, and the like, and high molecular weight polyols, such as polyether polyols [adducts of alkylene oxides (such as ethylene oxide, propylene oxide, butylene oxides, and combinations of two or more these alkylene oxides) with low molecular weight compounds having at least two active hydrogen atoms (low molecular weight polyols as mentioned above, amines such as ethylene diamine, diethylene triamine, aminoethyl piperazine, and alkanol amines such as mono-, di- and tri-ethanol amines and propanol amines, and the like)], polyester polyols [polycondensation products of polycarboxylic acids (such as adipic acid, phthalic acid, terephthalic acid and the like) with polyols (such as low molecular weight polyols as mentioned above and polyether polyols as mentioned above), and ring opening polymerization products of lactams (such as ε-caprolactam)], and the like. NCO-content of the prepolymers are usually at least 0.5% preferably 2-20% or more.

Among these organic polyisocyanates, preferred are aromatic polyisocyanates (especially MDI, TDI), aliphatic polyisocyanates (especially HDI), cycloaliphatic polyisocyanates (especially $H_{12}MDI$, IPDI), modified polyisocyanates (especially IPDI trimer), and NCO-terminated prepolymers dirived from these polyisocyanates and polyether polyols.

In the preparation of blocked polyisocyanates, organic polyisocyanates and blocking agents may be reacted by any methods known in the art. For instance, polyisocyantes are reacted at a temperature of generally 50°-120° C. preferable 60°-100° C., with blocking agents, in an equivalent ratio of NCO-reactive groups/NCO groups of usually 1/1-2/1 or higher, preferably 1.05/1-1.2/1. If partially blocked polyisocyanates are desired, lower equivalent ratio of NCO-reactive groups/NCO-groups, such as 0.5/1-1/1, may be used. Polyisocyanates and blocking agents can be preferably reacted in bulk. If necessary, the reaction may be carried out in inert solvents such as toluene, methyl ethyl ketone, dichlorobenzenes, dibutyl phthalate, dioctyl phthalate, dioctyl adipate, and the like.

Blocked polyisocyanates preferable for use in the compositions of this invention are those capable of dissociating into the original components to reproduce free NCO-groups, in the presence of the catalyst (C), at a temperature of 110°-250° C. especially 120°-200° C.

In the composition according to this invention comprising (A) at least one acrylic copolymer having NCO-reactive groups, (B) at least one blocked polyisocyanate and (C) catalyst comprising at least one cycloamidine compound, the amount of (C) can vary widely within the scope of the present invention, i.e., in a range such that the composition can be applied by hot-melt coating and can reproduce easily free NCO-groups to cure the composition at an elevated temperature preferably 110°-250° C. more preferably 120°-200° C. The content of the cycloamidine compound is generally 0.01-20% preferably 0.05-10% based on the weight of the composition. (In case where the other catalyst is used in conjunction, the total amount is within the above range.) The amount of (C) lower than 0.01% is insufficient to reproduction of NCO-groups; and use of too much amount of (C) causes reproduce of NCO-groups at too lower temperature and results in viscosity increase and sometimes dificulties in mixing and applying of the composition. The weight ratio of (C)/(A) is usually 0.01/100-20/100 preferably 0.05/100-10/100. The weight ratio of (C)/(B) is generally 1/100-50/100.

The ratio of (B) to (A) corresponds to an equivalent ratio of blocked NCO-groups of (B) to NCO-reactive groups of (A) from 0.01:1 to 0.4:1, preferably 0.1:1 to 0.3:1. When the equivalent ratio is higher than 0.4:1, tackiness of pressure-sensitive adhesives is drastically reduced. The equivalent ratio lower than 0.01:1 provides products having poor static shear performance.

Process for producing the composition according to the present invention is not particularly restricted. It is economical and preferable to produce the composition by mixing (A) obtained by bulk polymerization, (B) and (C) under heating at a temperature of, for instance, 50°-150° C.

The composition comprising (A), (B) and (C) according to this invention may contain, if necessary, other components, such as tackifying additives. Suitable tackifying additives include, for example, rosin (from gum, wood or tall oil), and rosin derivatives, such as hydrogenated rosin, glycerin ester of hydrogenated rosin and methyl ester of hydrogenated rosin; polyterpene resins, such as poly (β-pinene), phenolic modified terpene resins; polystyrenes, such as poly (α-methyl styrene); coumarone-indene resins, such as polymerized coal-tar light oils, phenolic modified coumarone-indene resins; petroleum resins, such as C 5 petroleum resins, C 9 petroleum resins, cycloaliphatic (hydrogenated) petroleum resins; chlorinated biphenyl resins, such as chlorinated biphenyl and chlorinated polyphenyls; and the like. These tackifier may be used in an amount from 0 to about 30% by weight and more, based on the weight of the composition. Chain extenders may be used, including other polyols such as those described in connection with preparation of NCO-terminated prepolymer, as well as amines and the like. Other additives known in the art may also be used, for example, stabilizers, such as antioxidants (hindered phenols such as butylated hydroxytoluene), photostabilizers, and the like; plasticizers such as dioctyl phthalate; pigments such as clays and titanium dioxide, flow modifiers such as colloidal silicas, fire-retardants such as antimony oxide; and the like. A solvent need not be used, thereby avoiding toxicity and flammability problems, excessive bulk per unit amount of adhesives, and extra costs of the solvent itself. However, a solvent or solvent mixture may be used in some cases to enhance compatibility and flow properties of the components. Exemplary of such solvents include aromatic hydrocarbons such as benzene, toluene, xylene and mesitylene; ketones such as methyl ethyl ketone; chlorinated hydrocarbons such as methylene chloride and trichloroethanes; esters such as ethyl acetate and 2-ethoxyethyl acetate; and alkanes such as pentane, hexane and heptane; and mixtures of two or more of these solvents. The total amount of these optional additives is generally 0–70% preferably 0–50% based on the weight of the composition. These components may be mixed in any order and by any method.

The composition according to this invention, comprising (A), (B) and (C) and optionally the other additives, has melt-viscosity of generally 1,000–500,000 preferably 5,000–200,000 cps. at 100°–200° C.

In applying the composition according to this invention as adhesive, the composition can be applied by melting the composition at a temperature lower than the deblocking temperature of blocked polyisocyanate (generally 120°–250° C.), preferably at a temperature lower at least 10° C. (more preferably 20°–60° C.) than the deblocking temperature.

Conventional application means may be used for melt coating of the composition. The composition can be applied by using any known hot-melt applicators, including hot-melt coaters such as roll coaters, die coaters and the like. Exemplary of such coaters are "Park Coater" (sold by Bolton Emerson Inc.), "PAK" (sold by Maschinenfabric Max. Kroenert), "Polymelt" (sold by Polytype, S.A.), "Thermo Coater" (sold by Pagendarm G.m.b.H.) and "Multimelt" (sold by Holweg, S.A.). The composition may be directly applied onto a substrate (direct coating), or it may be applied onto a release sheet (release paper such as silicone-coated paper, and the like) and then transferred onto a substrate under pressure (transfer coating). Suitable examples of substrates are plastic films such as polyester film, polypropylene film and polyvinyl chloride film, papers such as fine paper kraft paper, mirror-coated paper and synthetic papers, cellophane, metal foils such as aluminum foil, cloth, and the like. When a heat-sensitive plastic film (such as polyethylene, polypropylene) is used as the substrate, transfer coating is preferred.

The amount of the composition coated on the substrate can vary widely, for instance, from 5 to 100 g/m² preferably from 10 to 50 g/m².

The coated substrate is generally cured partially or completely by heating to the deblocking temperature or higher, followed by aging if necessary. Suitable heating means include, for example, circulating air ovens, infrared or near infrared heaters, high-frequency heaters and the like. Heating (curing of the composition) is usually, carried out at a temperature of 110°–250° C. preferably 120°–200° C. Heating time is usually 0.1–20 min. preferably 1–10 min. Conditions of aging can vary widely. For instance, aging may be conducted for 3–7 days at room temperature, or for 24 hours at 70° C.

Adhesive compositions according to the present invention and coated substrates therefrom can give full play of tackiness, after such curing.

The compositions according to this invention provide invariably adhesive products having excellent tackiness, even when processing conditions (temperature and time) of melt coating are varied. In addition, products, thus obtained, show no tendency of changing in quality (such as reduction of adhesivity), during storage over long period of time.

The compositions of this invention are useful as pressure-sensitive adhesives, for labels (stickers), tapes, contact films, other laminate structures and the like. The compositions in bulk are particularly useful as adhesives for medical applications wherein residual solvents give rise to trouble.

Having generally described the invention, a more complete understanding can be obtained by reference to certain specific examples, which are included for purposes of illustration only and are not intended to be limiting unless otherwise specified. In the examples, parts and % designate parts by weight and % by weight, respectively.

EXAMPLE 1

A monomer mixture was prepared by mixing 95 parts of n-butyl acrylate and 5 parts of acrylic acid. A reaction vessel equipped with a dropping funnel, a reflux condenser, a stirrer and a nitrogen inlet tube was charged with 20% of the monomer mixture. The mixture was stirred under a nitrogen atomsphere and heated to 80° C. Then, the balance (80 parts) of the monomer mixture, containing 0.5 parts of benzoil peroxide dissolved therein, was added drop-wise into the reaction vessel through the dropping funnel over 4 hours, followed by aging for additional 4 hours. During the polymerization, the temperature of the polymerization mixure was gradually increased with exothermic heat of the polymerization and reached a temperature of 120° C. Thus, there was obtained an acrylic copolymer having a melt-viscosity of 100,000 cps. at 120° C.

There were added, to 100 parts of the acrylic copolymer, 3 parts of Millionate MS-50 (MDI blocked with cresol, produced by Nippon Polyurethane Ind. Co. Ltd.) and 0.5 parts of DBU. The mixture was applied by hand using a coating-rod onto a polyester film (having a thickness of 25μ) to obtain a coat having a thickness of 25μ on the film. Thereafter, the coated film was heated for 2 minutes or 10 minutes with hot air at 160° C. to activate blocked NCO groups and cure the mixture on the film. The resulting coated film was aged at 70° C. for 24 hours, and then peel strength and static shear performance of the cured composition were tested according to the following methods:

(1) Peel strength:

A specimen having 25 mm width is bonded under pressure onto a stainless steel plate, under an atomosphere of 20° C. and 65% R.H., by reciprocating a 2 Kg roller; and, after 30 minutes, 180° peel adhesion (peel rate 300 mm/min.) is determined.

(2) Static shear performance:

A specimen (25 mm×25 mm) is laminated onto a stainless steel plate under pressure by reciprocating a 5 Kg roller one time; and, after allowing to stand for 20 minutes in an atmosphere of 40° C., a load of 1 Kg is applied to measure distance of shear after 24 hours or time until the load falls down.

EXAMPLES 2–4

EXAMPLE 1 was repeated except that the following monomers, blocked polyisocyanates and cycloamidine compounds were used.

EXAMPLE 2

{ 94 parts of n-butyl acrylate
6 parts of hydroxyethyl acrylate
2 parts of Coronate AP stable (trimethylol propane-TDI adduct blocked with phenol, produced by Nippon Polyurethane Ind. Co. Ltd.)
0.4 parts of DBU

EXAMPLE 3

```
{ 57 parts of n-butyl acrylate
  40 parts of 2-ethylhexyl acrylate
  3 parts of acrylamide
  3 parts of Millionate MS-50
  0.6 parts of DBU 2-ethylhexanoate
```

EXAMPLE 4

```
{ 86 parts of n-butyl acrylate
  10 parts of vinyl acetate
  4 parts of acrylic acid
  5 parts of H12MDI blocked with methyl ethyl ketone oxime
  0.1 parts of DBU phenolate
```

COMPARATIVE EXAMPLE 1

EXAMPLE 1 was repeated without using DBU.

COMPARATIVE EXAMPLE 2

COMPARATIVE EXAMPLE 1 was repeated except that 45 parts of Millionate MS-50 was used.
Test results were as shown in TABLE I.

TABLE 1

| | Activation time, Minutes | Peel strength, g/25 mm | Static shear performance |
|---|---|---|---|
| EXAMPLE 1 | 2 | 1000 | less than 0.1 mm |
|  | 10 | 1000 | less than 0.1 mm |
| EXAMPLE 2 | 2 | 1100 | 0.3 mm |
|  | 10 | 1100 | 0.3 mm |
| EXAMPLE 3 | 2 | 800 | less than 0.1 mm |
|  | 10 | 800 | less than 0.1 mm |
| EXAMPLE 4 | 2 | 1200 | 0.1 mm |
|  | 10 | 1200 | 0.1 mm |
| COMPARATIVE EXAMPLE 1 | 2 | 3000* | 1 minutes* |
|  | 10 | 1000 | 0.5 mm |
| COMPARATIVE EXAMPLE 2 | 2 | 1000 | 3 mm |
|  | 10 | 50 | 1 minutes** |

Notes:
*Test sample failed cohesively, leaving adhesive on both surfaces.
**Test sample failed adhesively, at interface between stainless steel plate and adhesive.

What is claimed is:

1. A label, tape, contact film or other laminate structure comprising at least one substrate layer and an adhesive layer thereon having as adhesive a composition comprising
   (A) at least one acrylic copolymer of 0.5–10% by weight of at least one ethylenically unsaturated monomer (a) having at least one NCO-reactive group, and 90–99.5% by weight of at least one ethylenically unsaturated monomer (b) having no NCO-reactive group, comprising an ester of (meth)acrylic acid with an alcohol having 1–14 carbon atoms;
   (B) at least one blocked polyisocyanate comprising a reaction product of an organic polyisocyanate with at least one blocking agent selected from the group consisting of phenols, C- H- acid compounds, lactams, oximes, bisulfites, tertiary alcohols, secondary aromatic amines, imides and mercaptans;
   (C) catalist comprising at least one cycloamidine compound selected from the group consisting of cycloamidines having the general formula (1) and salts thereof:

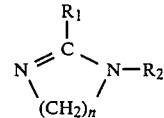
(1)

[wherein $R_1$ is H or an alkyl group having 1–8 carbon atoms, $R_2$ is an alkyl group having 1–8 carbon atoms, or $R_1$ and $R_2$ may be joined to form a ring having 2–11 methylene groups, n is an integer of 2–6, and each of the methylene groups may carry a lower alkyl substituent];
wherein equivalent ratio of the blocked NCO group of (B) to the NCO-reactive group of (A) is 0.01–0.4:1.

2. The laminate structure of claim 1, wherein the adhesive composition is present in an amount of 5 to 100 g/m².

3. The laminate structure of claim 1, wherein the composition has been applied onto a substrate by hot-melt coating.

4. The laminate structure of claim 3, wherein the substrate is plastic film, paper, cellophane, metal foil or cloth.

5. A cured laminate structure of claim 1.

6. A pressure-sensitive adhesive material comprising cured laminate structure of claim 5.

7. The pressure-sensitive adhesive material of claim 6, which is pressure-sensitive adhesive tape, film or label.

8. A process for producing a pressure-sensitive adhesive material, which comprises
   [1] applying onto a substrate a composition comprising
   (A) at least one acrylic copolymer of 0.5–10% by weight of at least one ethylenically unsaturated monomer (a) having at least one NCO-reactive group, and 90–99.5% by weight of at least one ethylenically unsaturated monomer (b) having no NCO-reactive group, comprising an ester of (meth)acrylic acid with an alcohol having 1–14 carbon atoms;
   (B) at least one blocked polyisocyanate comprising a reaction product of an organic polyisocyanate with at least one blocking agent selected from the group consisting of phenols, C- H- acid compounds, lactams, oximes, bisulfites, tertiary alcohols, secondary aromatic amines, imides and mercaptans;
   (C) catalyst comprising at least one cycloamidine compound selected from the group consisting of cycloamidines having the general formula (1) and salts thereof:

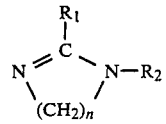
(1)

[wherein $R_1$ is H or an alkyl group having 1–8 carbon atoms, $R_2$ is an alkyl group having 1–8 carbon atoms, or $R_1$ and $R_2$ may be joined to form a ring having 2–11 methylene groups, n is an integer of 2–6, and each of the methylene groups may carry a lower alkyl substituent]; wherein equivalent ratio of the blocked NCO group of (B) to the NCO-reactive group of (A) is 0.01–0.4:1;
   [2] curing the composition by heating to a deblocking temperature of (B) 110°–250° C. higher to dissociate and react free NCO groups with NCO-reactive groups of (A).

9. The process of claim 8, wherein the composition is applied by using a hot-melt applicator.

10. The process of claim 8, wherein the composition is coated onto a release sheet and then the composition is transferred onto a substrate.

11. The process of claim 8, wherein the composition is applied directly onto a substrate.

12. The process of claim 8, wherein the substrate is plastic film, paper metal foil or cloth.

13. A process comprising mixing and curing at a temperature of 110°–250° C. a composition comprising (A) at least one acrylic copolymer of 0.5–10% by weight of at least one ethylenically unsaturated monomer (a) having at least one NCO-reactive group, and 90–99.5% by weight of at least one ethylenically unsaturated monomer (b) having no NCO-reactive group, comprising an ester of (meth-)acrylic acid with an alcohol having 1–14 carbon atoms;

(B) at least one blocked polyisocyanate comprising a reaction product of an organic polyisocyanate with at least one blocking agent selected from the group consisting of phenols, C- H- acid compounds, lactams, oximes, bisulfites, tertiary alcohols, secondary aromatic amines, imides and mercaptans;

(C) catalyst comprising at least one cycloamidine compound selected from the group consisting of cycloamidines having the general formula (1) and salts thereof:

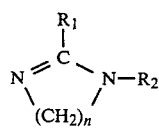
(1)

[wherein $R_1$ is H or an alkyl group having 1–8 carbon atoms, $R_2$ is an alkyl group having 1–8 carbon atoms, or $R_1$ and $R_2$ may be joined to form a ring having 2–11 methylene groups, n is an integer of 2–6, and each of the methylene groups may carry a lower alkyl substituent]; wherein equivalent ratio of the blocked NCO group of (B) to the NCO-reactive group of (A) is 0.01–0.4:1.

14. A composition suitable for application by hot-melting, which comprises (A) at least one acrylic copolymer of 0.5–10% by weight of at least one ethylenically unsaturated monomer (a) having at least one NCO-reactive group, and 90–99.5% by weight of at least one ethylenically unsaturated monomer (b) having no NCO-reactive group, comprising an ester of (meth-)acrylic acid with an alcohol having 1–14 carbon atoms;

(B) at least one blocked polyisocyanate comprising a reaction product of an organic polyisocyanate with at least one blocking agent selected from the group consisting of phenols, C- H- acid compounds, lactams, oximes, bisulfites, tertiary alcohols, secondary aromatic amines, imides and mercaptans;

(C) catalyst comprising at least one cycloamidine compound selected from the group consisting of cycloamidines having the general formula (1) and salts thereof:

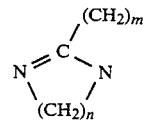
(1)

[wherein $R_1$ is H or an alkyl group having 1–8 carbon atoms, $R_2$ is an alkyl group having 1–8 carbon atoms, or $R_1$ and $R_2$ may be joined to form a ring having 2–11 methylene groups, n is an integer of 2–6, and each of the methylene groups may carry a lower alkyl substituent];
wherein equivalent ratio of the blocked NCO group of (B) to the NCO-reactive group of (A) is 0.01–0.4:1.

15. The composition of claim 14, wherein said monomer (a) is selected from the group consisting of carboxyl group-containing monomer, hydroxyl group-containing monomer and amide group-containing monomer.

16. The composition of claim 14, wherein said monomer (a) is (meth) acrylic acid, crotonic acid, maleic acid, itaconic acid, fumaric acid, hydroxyethyl (meth)acrylate, hydroxypropyl (meth)acrylate, poly alkylene (C 2-3)glycol (meth)acrylate, (meth)allyl alcohol, poly alkylene (C 2-3)glycol (meth)allyl ether, (meth)acrylamide, N-methylol (meth)acrylamide, hydroxyethyl (meth)acrylamide, or a mixture of 2 or more of these monomers.

17. The composition of claim 14, wherein said ester is at least one selected from the group consisting of alkyl (meth)acrylate, cyclohexyl (meth)acrylate and benzyl (meth)acrylate.

18. The composition of claim 14, wherein the acrylic copolymer has a molecular weight of 5,000–1,000,000.

19. The composition of claim 14, wherein the acrylic copolymer has a melt-viscosity of 5,000–200,000 cps. at 100°–200° C.

20. The composition of claim 14, wherein said cycloamidine is a diaza-bicycloalkene having the general formula (2):

$$\underset{(CH_2)_n}{\overset{(CH_2)_m}{N}}\!\!\!\!\!\!\!\!\!\!\!\!\!\!C\!\!\!=\!\!N \quad (2)$$

wherein m is an integer of 2–11, n is an integer of 2–6, and each of the methylene groups may carry a lower alkyl substituent.

21. The composition of claim 14, wherein said salt is selected from carboxylic acid addition salts and phenol addition salts of the cycloamidine.

22. The composition of claim 14, wherein the amount of (C) is 0.01–20% by weight based on the weight of the composition.

23. The composition of claim 14, which further contains at least one tackifying resin.

24. The composition of claim 14, which has a melt-viscosity of 1,000–500,000 cps. at 100°–200° C.

25. A cured composition of claim 14.

26. The composition of claim 14, wherein said monomer (b) comprises 20–100% by weight of said ester and 0–80% by weight of at least one other vinyl monomer.

27. The composition of claim 26, wherein said vinyl monomer is at least one selected from the group consisting of vinyl aromatic hydrocarbon monomers, vinyl esters, (meth)allyl esters, vinyl ethers, (meth)allyl ethers, (meth)acrylates, unsaturated nitrile, halogen-containing monomers, monoolefins, dienes, heterocyclic vinyl monomers, and epoxy-containing monomers.

* * * * *